(12) United States Patent
Chang et al.

(10) Patent No.: US 11,820,449 B2
(45) Date of Patent: Nov. 21, 2023

(54) INDEPENDENT CORNER MODULE (71) Applicants: Hyundai Motor Company, Seoul (KR); Kia Corporation, Seoul (KR)

(72) Inventors: Sehyun Chang, Suwon-si (KR); Sang Woo Hwang, Seoul (KR); Min Jun Kim, Busan (KR); Young Il Sohn, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/956,978

(22) Filed: Sep. 30, 2022

(65) Prior Publication Data
US 2023/0137268 A1    May 4, 2023

(30) Foreign Application Priority Data
Oct. 28, 2021   (KR) .......................... 10-2021-0145083

(51) Int. Cl.
*B62D 7/14*   (2006.01)
*B62D 7/18*   (2006.01)

(52) U.S. Cl.
CPC ............... *B62D 7/146* (2013.01); *B62D 7/18* (2013.01)

(58) Field of Classification Search
CPC ............. B62D 7/18; B62D 7/06; B62D 7/146
See application file for complete search history.

(56) References Cited

U.S. PATENT DOCUMENTS

| 655,256 A | * | 8/1900 | MacPherson | B62D 7/06 280/93.504 |
| 1,493,683 A | * | 5/1924 | Lavoie | B62D 7/18 301/6.5 |
| 9,283,988 B1 | * | 3/2016 | Ramoutar | B62D 9/00 |
| 9,731,572 B2 | | 8/2017 | Tamura et al. | |
| 10,814,904 B2 | * | 10/2020 | Washnock | F16H 25/2204 |
| 2007/0045036 A1 | * | 3/2007 | Takeuchi | B62D 5/0418 280/124.145 |
| 2019/0002017 A1 | * | 1/2019 | Fay, II | B62D 5/26 |
| 2019/0351932 A1 | * | 11/2019 | Washnock | B62D 5/0454 |
| 2020/0262263 A1 | * | 8/2020 | Doerksen | B60K 7/0007 |
| 2021/0008939 A1 | * | 1/2021 | Schmidt | B62D 7/146 |
| 2021/0039707 A1 | * | 2/2021 | Washnock | B62D 3/08 |
| 2022/0081031 A1 | * | 3/2022 | Kim | B62D 7/06 |

(Continued)

FOREIGN PATENT DOCUMENTS

| CN | 106335542 A | * | 1/2017 | ............ B60G 13/02 |
| CN | 106627746 A | * | 5/2017 | |
| DE | 102015209850 A1 | * | 12/2016 | |

(Continued)

*Primary Examiner* — Paul N Dickson
*Assistant Examiner* — Maxwell L Meshaka
(74) *Attorney, Agent, or Firm* — Slater Matsil, LLP (57) ABSTRACT An embodiment independent corner module includes a knuckle unit positioned at an inward area of a wheel, an upper arm fastened between an upper end of the knuckle unit and a vehicle body, a lower arm fastened between a lower end of the knuckle unit and the vehicle body, a steering unit configured to input a steering angle to the knuckle unit by being rotated with respect to the lower arm, and a rack steering unit positioned under the steering unit and fastened to the knuckle unit, the rack steering unit being configured to apply a rotating force to the knuckle unit by varying a length thereof.

20 Claims, 5 Drawing Sheets (56) References Cited

U.S. PATENT DOCUMENTS

2023/0001759 A1\* 1/2023 Doerksen ............. G05D 1/0231

FOREIGN PATENT DOCUMENTS

| JP | H05124535 | A | 5/1993 | | |
|----|-----------|---|--------|---|---|
| JP | H10278525 | A | 10/1998 | | |
| JP | 2007320452 | A | 12/2007 | | |
| JP | 5326528 | B2 | 10/2013 | | |
| JP | 2014069741 | A | 4/2014 | | |
| KR | 20070103191 | A | 10/2007 | | |
| KR | 101219564 | B1 | 1/2013 | | |
| KR | 102041918 | B1 | 11/2019 | | |
| KR | 20210073721 | A | 6/2021 | | |
| WO | WO-2016188686 | A1 \* | 12/2016 | ............... | B60G 3/20 |

\* cited by examiner

INDEPENDENT CORNER MODULE

CROSS-REFERENCE TO RELATED APPLICATIONS

This application claims the benefit of Korean Patent Application No. 10-2021-0145083, filed on Oct. 28, 2021, which application is hereby incorporated herein by reference.

TECHNICAL FIELD

The present disclosure relates to an independent corner module.

BACKGROUND

A conventional suspension device of a vehicle prevents damage to a vehicle body or cargo and improves riding comfort by connecting an axle and the vehicle body to prevent vibration or a shock received from a road surface from being directly transmitted to the vehicle body when driving. The suspension device includes a suspension spring for absorbing an impact from the road surface, a shock absorber for improving riding comfort by attenuating free vibration of the suspension spring, and a stabilizer for suppressing a rolling of the vehicle.

As a suspension device applied to a commonly used vehicle, a solid axle suspension device in which left and right wheels are connected to each other by one axle is mainly used. Further, as a suspension spring, a leaf spring or an air spring is mainly used.

A steering device applied to the commonly used vehicle using the solid axle suspension device includes a pitman arm mounted on an output axis of a steering gear and configured to rotate, a drag link configured to transfer a movement of the pitman arm to a knuckle arm, the knuckle arm configured to operate a knuckle spindle by receiving the movement of the drag link, a tie-rod connecting left and right knuckle arms to each other, and so on.

Figure 1:
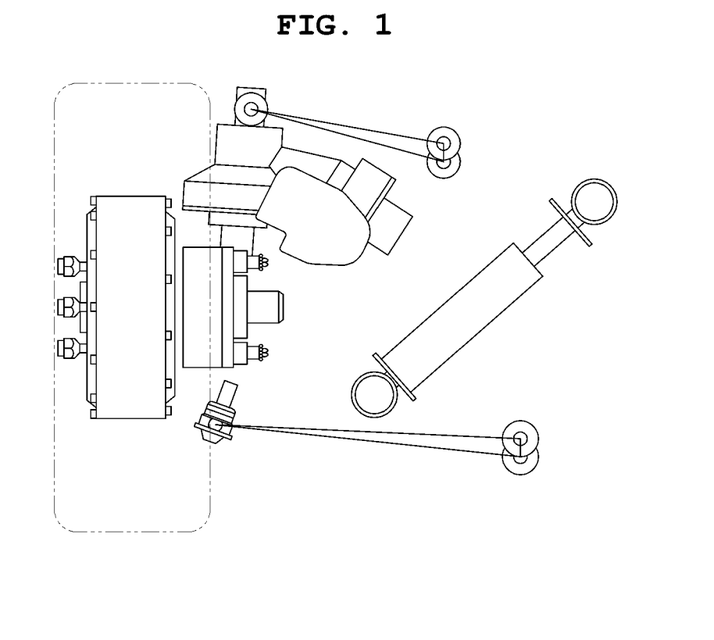
FIG. 1 is a view of a conventional art illustrating a coupling relationship of a knuckle.

As disclosed in FIG. 1, a suspension system in which a first end of the shock absorber is fixed to a vehicle body frame is illustrated.

In the vehicle using the air spring, the solid axle suspension device, and the steering device as described above, the air spring only performs a replacement of the leaf spring and does not significantly contribute to improving the riding comfort and steering characteristics. Further, due to structural characteristics, it is difficult to secure a design freedom to realize precise geometry.

In addition, an independent steering type suspension device in which a steering angle of a wheel is input to each of the suspension devices through a motor assembly has been recently developed. However, in the independent steering type suspension device as described above, there is a problem that a rotating force applied from a steering motor is difficult to be stably transferred to a knuckle and the wheel. In addition, when only a steering unit performing large steering is used, there is a problem that an interference with the vehicle body occurs.

Korean Patent Application Publication No. 10-2007-0103191 (published on Oct. 23, 2007) describes information related to the subject matter of the present disclosure.

SUMMARY

The present disclosure relates to an independent corner module. Particular embodiments relate to an independent corner module capable of applying wide ranges of a steering angle to a wheel by optionally or simultaneously driving a steering unit and a rack steering unit that are configured to input the steering angle to the wheel.

Accordingly, embodiments of the present disclosure have been made keeping in mind problems occurring in the related art, and an embodiment of the present disclosure provides an independent corner module that enables a steering driving unit and an axle gear portion to be independently rotated.

In addition, another embodiment of the present disclosure provides an independent corner module including a wheel to which a steering angle is applied by performing independent movements of a knuckle and a double wishbone knuckle.

Features of the present disclosure are not limited to the above features. Other and further features of the present disclosure should become apparent upon understanding of the various embodiments described below. Further, the features of embodiments of the present disclosure may be realized by means and combinations thereof indicated in the appended claims.

The independent corner module includes the following configurations.

Embodiments of the present disclosure may achieve the following effects from the embodiments and configurations described below, as well as combinations and relationships of use thereof.

In embodiments of the present disclosure, an effect that wider ranges of steering angle applied to a wheel are provided by independently rotating a steering unit and a rack steering unit.

In addition, since two kingpin axes are formed by providing different steering driving portions fastened to a knuckle unit, embodiments of the present disclosure have an effect that a stable behavior of the wheel is realized.

BRIEF DESCRIPTION OF THE DRAWINGS

The above and other objectives, features, and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Hereinafter, embodiments of the present disclosure will be described in detail with reference to the accompanying drawings. The present disclosure may, however, be embodied in different forms and should not be construed as limited to the embodiments set forth herein. In addition, the embodiments of the present disclosure are intended to fully describe the present disclosure to a person having ordinary knowledge in the art to which the present disclosure pertains.

In addition, the terms " . . . knuckle", " . . . unit", " . . . portion", " . . . frame" and the like described herein may refer to a unit for processing at least one function or operation, and they may be implemented in hardware or a combination of hardware.

Hereinafter, the embodiments will be described in detail with reference to the accompanying drawings, and in the description with reference to the accompanying drawings, like reference numerals indicate like or corresponding elements and redundant descriptions are omitted herein.

Embodiments of the present disclosure relate to an independent corner module. In a multi-wheel vehicle, the independent corner modules respectively fastened to wheels of a vehicle body may be included. Further, the independent corner module may be configured such that up to 90 degrees in left and right directions of a steering angle may be realized. More preferably, the independent corner module in which a steering unit 200 performing a large steering and a rack steering unit 300 performing a small steering are capable of independently inputting a steering angle thereof to a wheel 10 is provided.

Since the independent corner module can be fixed to the vehicle body, the independent corner module may be fastened to the vehicle body via welding, bolting coupling, or the like. Further, the independent corner module may be electrically connected to a battery positioned in the vehicle body so that electric power is capable of being applied to the steering unit 200 or the rack steering unit 300 from the vehicle body. As described above, the independent corner module may be configured such that the independent corner module is fastened to the vehicle body via a usual method and is also electrically connected to a vehicle.

Hereinafter, according to an embodiment of the present disclosure, the independent corner module including the wheel 10 positioned at a left side of the vehicle will be described.

Figure 2:
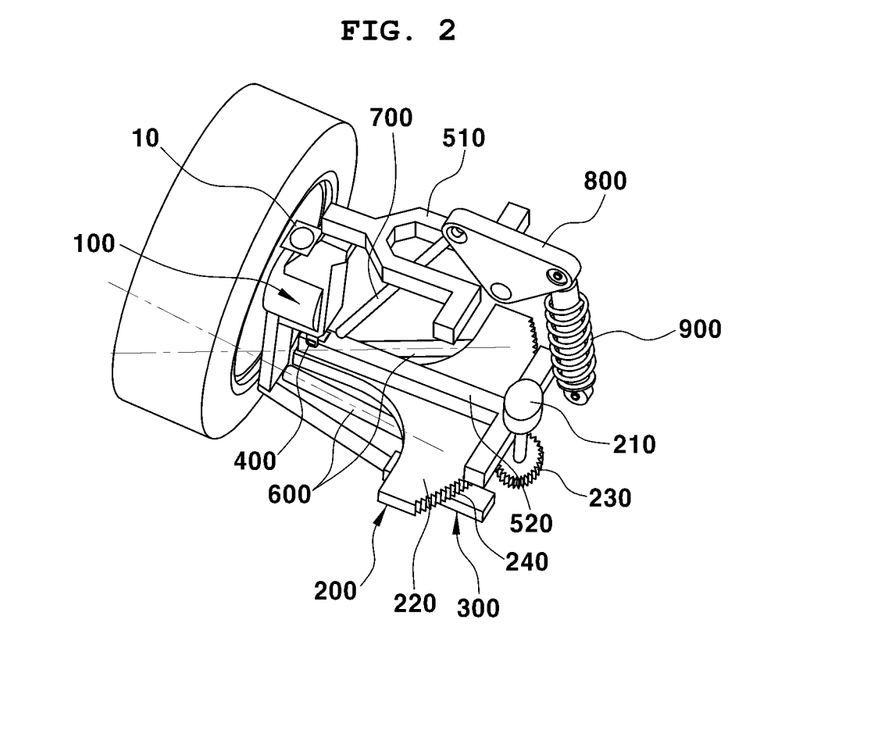
FIG. 2 is a perspective view illustrating an independent corner module according to an embodiment of the present disclosure.
Figure 3:
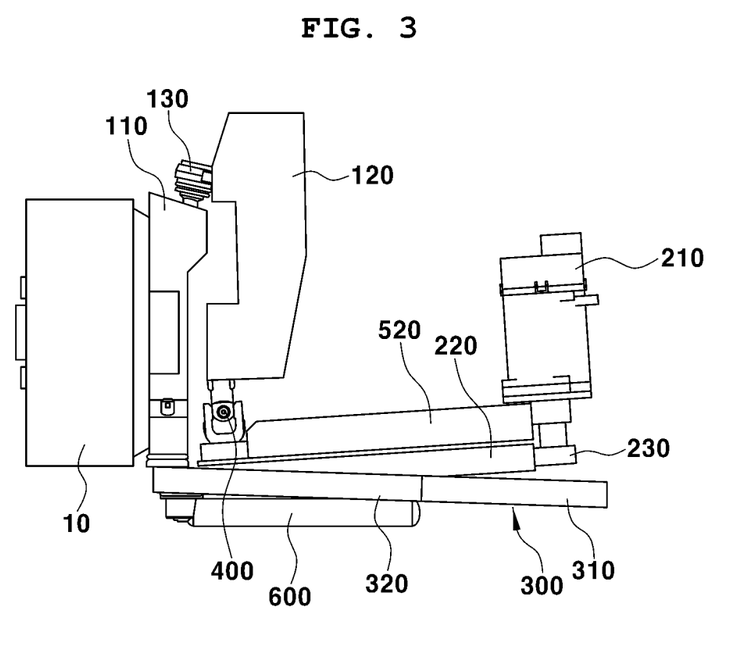
FIG. 3 is a front view illustrating the independent corner module according to an embodiment of the present disclosure.

In FIGS. 2 and 3, a perspective view and a front view of the independent corner module are illustrated as an embodiment of the present disclosure.

As illustrated in the drawings, the wheel 10 positioned at the outermost of the vehicle and a tire configured to cover the wheel 10 are included, and a knuckle unit 100 fastened to an inward area of the wheel 10 is provided. The knuckle unit 100 is configured such that the knuckle unit 100 is fixed to the vehicle body via an upper arm 510 positioned at an upper end of the knuckle unit 100 and a lower arm 520 positioned at a lower end of the knuckle unit 100. More preferably, the knuckle unit 100 includes a knuckle no positioned at a first side adjacent to the wheel 10, and a double wishbone knuckle 120 fastened such that the Knuckle no is capable of being rotated. Accordingly, the upper arm 510 and the lower arm 520 are fastened to the double wishbone knuckle 120.

In an embodiment of the present disclosure, the wheel 10 may include an in-wheel motor (not illustrated), and a driving force of the vehicle may be applied to the wheel 10 through the in-wheel motor.

By a ball joint portion 130, the knuckle no is fastened to the double wishbone knuckle 120 that is configured to surround an upper end of the knuckle no, and a lower end of the knuckle no is fixed by a lower link 600 such that a movement of the knuckle no in a width direction of the vehicle is restricted. Further, the double wishbone knuckle 120 is positioned between the upper arm 510 and the lower arm 520, and is fastened to the vehicle body. The knuckle 110 is capable of being rotated with respect to the ball joint portion 130 that is fastened to the double wishbone knuckle 120.

The steering unit 200 is positioned adjacent to a lower surface of the lower arm 520, and is configured such that a second end of the steering unit 200 is rotated with respect to a first end of the lower arm 520 fastened to the knuckle unit wo, in response to a driving of a motor 210 that is positioned at the lower arm 520. A steering frame 220 of the steering unit 200 that is rotated by the driving force of the motor 210 is configured such that a first end of the steering frame 220 is fastened to the double wishbone knuckle 120 together with the lower arm 520 and a second end of the steering frame 220 is formed in an arc shape. Therefore, the arc shape of the steering frame 220 facing the motor 210 is configured to be rotated according to the driving force of the motor 210. In addition, the motor 210 includes a motor gear portion 230 provided at a rotary shaft of the motor 210. Further, at a position where the steering frame 220 and the motor gear portion 230 are facing each other, a steering gear portion 240 positioned at a first end of the arc shape of the steering frame 220 is further included.

More preferably, at the first end where the lower arm 520 and the knuckle unit wo are fastened thereto, the lower arm 520, the steering unit 200, and the double wishbone knuckle 120 are fastened together through a joint unit 400. The lower arm 520 and the steering unit 200 that are fastened by the joint unit 400 are configured to be independently rotated around the joint unit 400. Therefore, when the steering frame 220 is rotated together with the double wishbone knuckle 120 by the motor 210 that is fastened to the one end of the lower arm 520, the lower arm 520 maintains a fixed state.

When a steering input is applied to the wheel 10 via the steering unit 200, the knuckle unit wo is configured to be rotated together with the steering unit 200 around a position where the knuckle unit wo is fastened to the lower arm 520 and the upper arm 510. More preferably, when the first end of the arc shape of the steering frame 220 is rotated with respect to the joint unit 400, the knuckle unit wo is configured to be rotated in an opposite direction to the steering frame 220 with respect to the joint unit 400. That is, the upper arm 510 and an upper end of the double wishbone knuckle 120 may be fastened to each other to limit a vertical movement while the double wishbone knuckle 120 is in a rotatable state. Further, the steering frame 220 and the double wishbone knuckle 120 are fastened to each other, and are configured to be rotatable with respect to the joint unit 400 independently of the lower arm 520.

The rack steering unit 300 is positioned at a lower end of the steering frame 220 of the steering unit 200, and a second end of the rack steering unit 300 is fastened to the knuckle unit 100. More preferably, the rack steering unit 300 includes a rack rod 320. The rack rod 320 is fastened to the knuckle unit 100, and is configured to apply force to the knuckle unit 100 toward the width direction of the vehicle in response to a driving of a rack motor 310. The rack rod 320 is fastened to a lower end of the knuckle no at a position eccentric to a first side with respect to a center of a longitudinal direction of the knuckle no. Since the rack rod 320 is eccentrically fastened to the knuckle no and the rack rod 320 is configured such that a length of the rack rod 320 is varied according to the driving of the rack motor 310, the knuckle no is configured to be rotated with respect to the double wishbone knuckle 120 in response to a change in the length of the rack rod 320.

In addition, two lower links 600 are fastened to the lower end of the knuckle no to which the rack rod 320 is fastened. Further, second ends of the lower links 600 are fastened to a lower surface of the steering frame 220. The lower links 600 prevent the lower end of the knuckle 110 from being moved in the width direction of the vehicle in response to the change in the length of the rack rod 320, and are configured to enable the knuckle no to be rotated according to the change in the length of the rack rod 320. More preferably, in response to the change in the length of the rack rod 320, the knuckle no is configured to be rotated along a virtual contact point of extended tangential lines of two lower links 600 in a longitudinal direction.

In addition, a push rod 700 having a first end thereof positioned in a top surface of the lower arm 520 and having a second end thereof fastened to a shock absorber 900 through a crank 800 is included. The push rod 700 is configured to absorb shocks in a vertical direction and a width direction and to transfer the shocks to the crank 800, and is configured to transfer the shocks to the shock absorber 900 that is fastened to the crank 800.

Accordingly, in embodiments of the present disclosure, the steering angle can be input to the wheel 10 without a rotation of the knuckle. Further, a dual steering structure capable of independently inputting the steering angle via a rotation of the knuckle no by using the rack steering unit 300 is provided.

Figure 4:
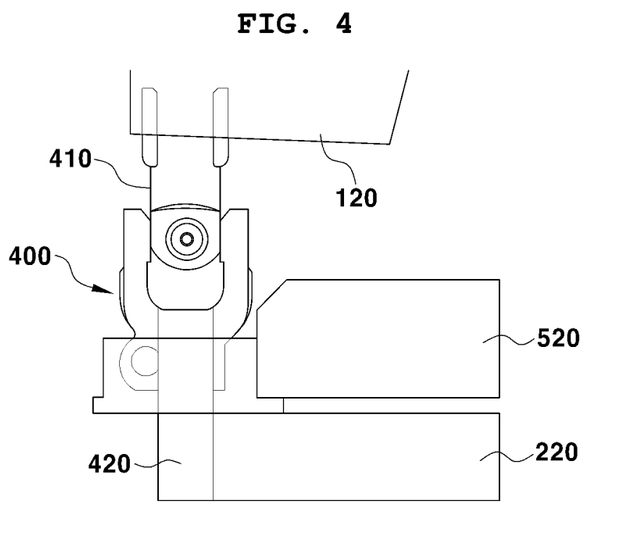
FIG. 4 is a view illustrating a coupling relationship of a lower arm, a steering frame, and a knuckle unit according to an embodiment of the present disclosure.

In FIG. 4, a structure in which the double wishbone knuckle 120, the lower arm 520, and the steering frame 220 are fastened to each other by the joint unit 400 is illustrated.

Since the joint unit 400 may be configured of a universal joint, an upper end portion 410 of the universal joint is positioned at and fastened to the double wishbone knuckle 120, and a rotary shaft portion 420 of the universal joint including a rotary shaft penetrates through the lower arm 520 and is fastened to the steering frame 220. The upper end portion 410 of the universal joint penetrates through the lower arm 520, and is fastened to the rotary shaft portion 420 of the universal joint. Further, since the steering frame 220 may be configured to be rotated around the rotary shaft portion 420 independently of the lower arm 520, the lower arm 520 may be in a state of being fixed to the vehicle body when the steering gear portion 240 of the steering frame 220 is rotated by the motor gear portion 230 of the motor 210.

That is, when the motor gear portion 230 is rotated in response to the driving of the motor 210 and the steering gear portion 240 is rotated integrally with the steering frame 220, the double wishbone knuckle 120 where the upper end portion 410 of the universal joint is fixed to and positioned on is rotated integrally with the steering frame 220, and the rotary shaft portion 420 of the universal joint is configured to be rotated along a penetrating hole of the lower arm 520. That is, when the steering frame 220 is rotated around the joint unit 400 as a central axis, the double wishbone knuckle 120 including the upper end portion 410 of the universal joint is configured to be rotated with respect to the penetrating hole of the lower arm 520.

Therefore, in response to the driving of the steering unit 200, a position of the lower arm 520 is fixed, and the steering frame 220 is configured to be rotated integrally with the double wishbone knuckle 120 according to the motor 210 that is positioned at the lower arm 520.

Figure 5:
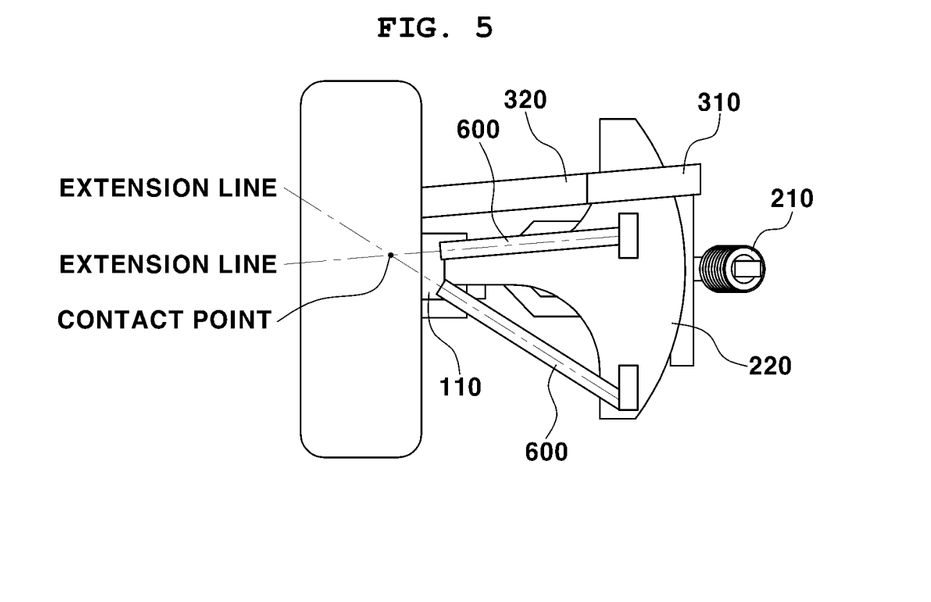
FIG. 5 is a bottom view illustrating the independent corner module according to an embodiment of the present disclosure.

In FIG. 5, a bottom surface of the independent corner module including two lower links 600 is illustrated.

As illustrated in the drawing, it is illustrated in that each of a first end of the lower links 600 is positioned at the steering frame 220 and two lower links 600 are fastened to the lower end of the knuckle no while being spaced apart from each other by a predetermined distance.

The lower links 600 are positioned between the steering frame 220 and the knuckle no, and are configured to fix the lower end of the knuckle no in response to the driving of the rack steering unit 300 and to guide the change in the steering angle of the knuckle no at the same time. In addition, as an embodiment of the present disclosure, two lower links 600 may be configured to be spaced apart from each other by the predetermined distance, and the two lower links 600 are configured to guide the amount of rotation and a rotating direction of the knuckle no.

That is, when the rack rod 320 extends in the longitudinal direction thereof, a first end where the lower link 600 positioned adjacent to the rack rod 320 and the knuckle no are facing each other is rotated in a direction toward a lower end of the drawing, and a first end where the lower link 600 positioned away from the rack rod 320 and the knuckle no are facing each other is also rotated in the direction toward the lower end of the drawing. Therefore, a steering angle having a left direction in the drawing is input to the knuckle no.

In contrast, when the rack rod 320 is retracted in the longitudinal direction thereof, the first end where the lower link 600 positioned adjacent to the rack rod 320 and the knuckle no are facing each other is rotated in a direction toward an upper end of the drawing, and the first end where the lower link 600 positioned away from the rack rod 320 and the knuckle no are facing each other is also rotated in the direction toward the upper end of the drawing. Therefore, a steering angle having a right direction in the drawing is input to the knuckle no.

Accordingly, in response to the longitudinal displacement of the rack rod 320, the lower links 600 rotatably fastened to the steering frame 220 are rotated to a predetermined position, and the wheel 10 is also rotated in response to a turning radius of each of the lower links 600, thereby applying the steering angle to the knuckle no.

In addition, since the lower links 600 are rotatably fastened to both the steering frame 220 and the knuckle no, the steering angle applied through the rack steering unit 300 may be set according to the amount of permissible rotation of the lower links 600 when the knuckle 110 is rotated.

That is, a tension in the width direction of the vehicle is applied to the first end of the knuckle 110 according to the longitudinal displacement of the rack rod 320, and the knuckle no is rotated along a contact point of virtual extension lines of two lower links 600, so that the steering angle is set.

Figure 6:
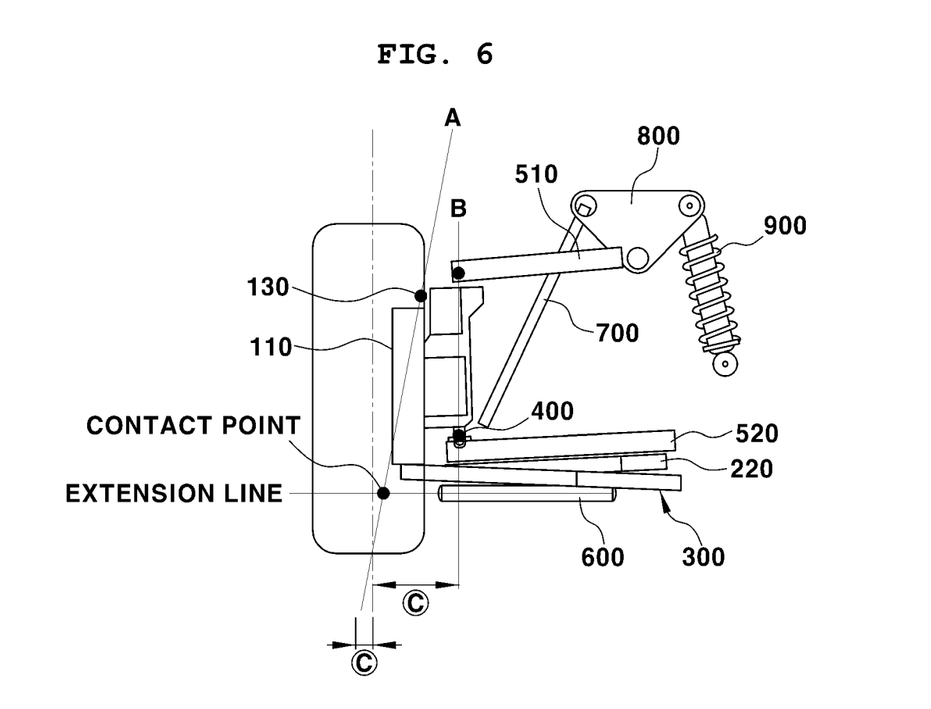
FIG. 6 is a view illustrating two kingpin axes that are different from each other and that are configuring the independent corner module according to an embodiment of the present disclosure.

In addition, as illustrated in FIG. 6, the contact point of the virtual extension lines of two lower links 600 set a lower end center point of a first kingpin axis A.

In FIG. 6, the first kingpin axis A that corresponds to a steering input driven through the rack steering unit 300 and a second kingpin axis B that corresponds to a steering input driven through the steering unit 200 are illustrated.

As illustrated in the drawing, the kingpin axis is an axis connecting center points of the upper end and the lower end of the knuckle unit 100 that is rotated in response to the steering input, and is determined to reduce both a torque of a steering wheel and a road surface reaction force and to provide a steering wheel restoration torque.

In embodiments of the present disclosure, the knuckle no driven through the rack steering unit 300 includes the first kingpin axis A that is formed by connecting a ball joint portion 130 at the upper end to the contact point of virtual extension lines of two lower links 600, and includes the second kingpin axis B formed at the upper and lower ends of the double wishbone knuckle 120 that is positioned between the lower arm 520 and the upper arm 510. More preferably, the second kingpin axis B formed between one end where the upper arm and the double wishbone knuckle are fastened to each other and a second end where the lower arm and the double wishbone knuckle are fastened to each other.

Compared to the second kingpin axis B, the first kingpin axis A is configured such that an offset C thereof is relatively small, so that the first kingpin axis A desensitizes the vehicle from disturbances such as a rotational moment generated on the first kingpin axis A by a braking force, a kickback situation caused by an external force transferred from a road surface, and the like, thereby improving driving stability.

In comparison, the second kingpin axis B has a relatively large offset C of the wheel 10 compared to the offset C of the first kingpin axis A, and the steering of the knuckle unit 100 is performed on the basis of the second kingpin axis B through the steering unit 200.

Accordingly, in embodiments of the present disclosure, the first kingpin axis A is formed so that the steering angle is applied to the wheel 10 through the rack steering unit 300, and the second kingpin axis B is formed so that the steering angle is applied to the wheel 10 through the steering unit 200, thereby performing the rotation of the knuckle unit 100.

In addition, under a condition for providing the driving stability, it may be configured such that the steering angle is applied to the wheel 10 by using the first kingpin axis A. Further, under a condition for performing large steering, the steering angle is applied to the wheel 10 by using the steering unit 200 including the second kingpin axis B.

Figure 7A:
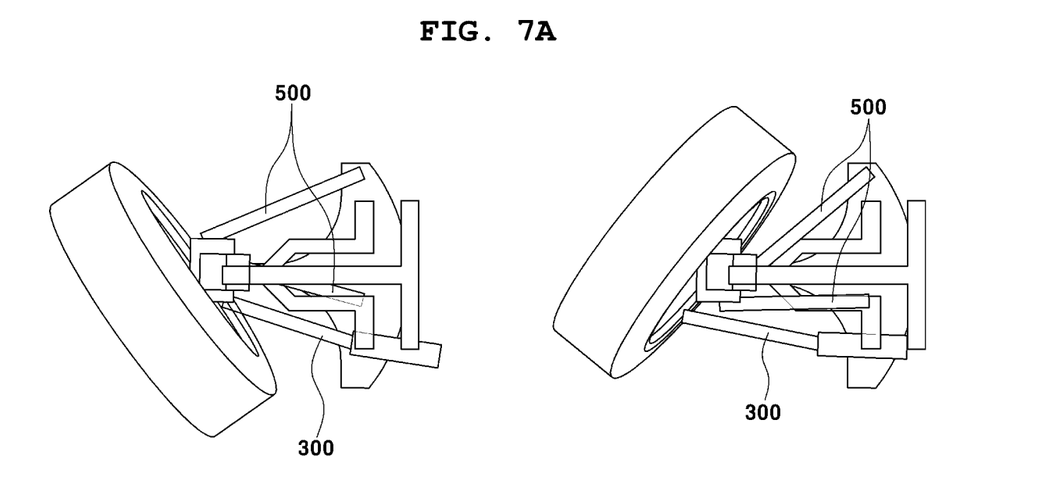
FIG. 7A shows an input of a steering angle through a rack steering unit of the independent corner module according to an embodiment of the present disclosure.

In FIG. 7A, as an embodiment of the present disclosure, top views of the independent corner module in which a steering angle is applied through the rack steering unit 300 are illustrated.

As illustrated in the drawing, the rack rod 320 of the rack steering unit 300 is configured such that the length thereof extends or retracts in response to the driving force of the rack motor 310. More preferably, the rack rod 320 is configured such that the length of the rack rod 320 that is positioned between the rack motor 310 and the knuckle no is varied in response to the driving of the rack motor 310.

In addition, the rack rod 320 is positioned at the lower end of the first side eccentric from the knuckle no of the knuckle unit 100. Therefore, when the rack motor 310 retracts the length of the rack rod 320, the first side end of the knuckle no fastened to the rack rod 320 is moved toward a position adjacent to a center of the vehicle, and a second side end of the knuckle no is moved toward a position away from the center of the vehicle. Through this, the knuckle no is rotated in response to the longitudinal displacement applied from the rack rod 320.

In addition, when the knuckle no is moved in response to the longitudinal displacement of the rack rod 320, the lower links 600 prevent the lower end of the knuckle no from moving away toward the width direction of the vehicle, and the lower links 600 guide the change in the steering angle of the knuckle 110.

As a result, the knuckle no is rotated in response to the longitudinal displacement of the rack rod 320, and also two lower links 600 fastened to the knuckle no are configured to guide the rotating direction of the knuckle 110, so that the steering angle is applied to the knuckle unit 100.

Figure 7B:
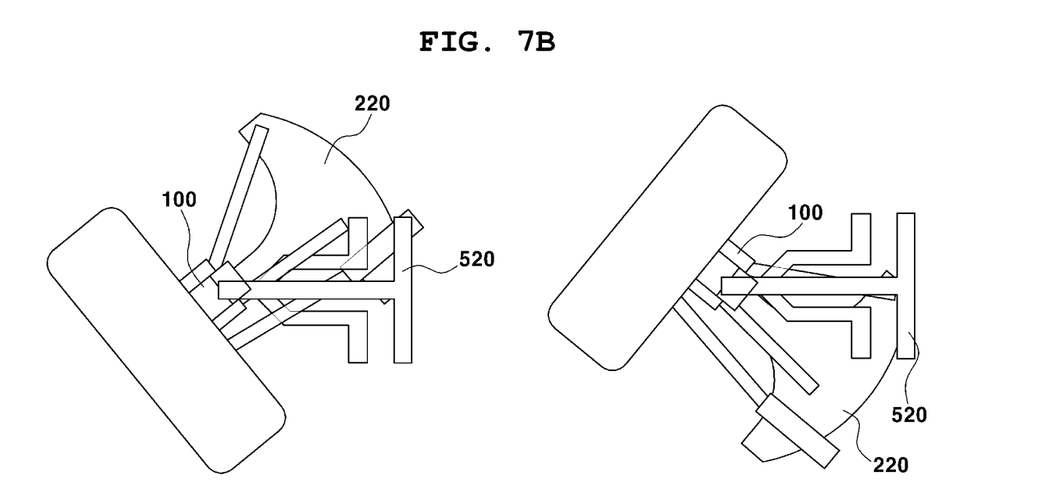
FIG. 7B shows an input of a steering angle through a steering unit of the independent corner module according to an embodiment of the present disclosure.

In comparison, FIG. 7B shows the driving of the steering input in which the knuckle unit 100 is integrally rotated through the steering unit 200.

As illustrated in the drawing, the motor 210 positioned at the lower arm 520 and fastened to the steering frame 220 is included, and the first end of the arc shape of the steering frame 220 where the steering gear portion 240 is positioned is moved along the motor gear portion 230 in response to the driving of the motor 210. When the steering frame 220 is rotated, the knuckle unit 100 fastened to the steering frame 220 is integrally rotated through the joint unit 400. In addition, the lower arm 520 is positioned between the knuckle unit 100 and the steering frame 220, and is fastened to the joint unit 400 such that the lower arm 520 is independently positioned in response to the rotation of the steering frame 220.

Therefore, when the steering frame 220 is rotated according to the driving of the motor 210, the steering frame 220 is rotated with respect to the double wishbone knuckle 120 integrally with the double wishbone knuckle 120, so that the steering angle is applied to the wheel 10.

Figure 7C:
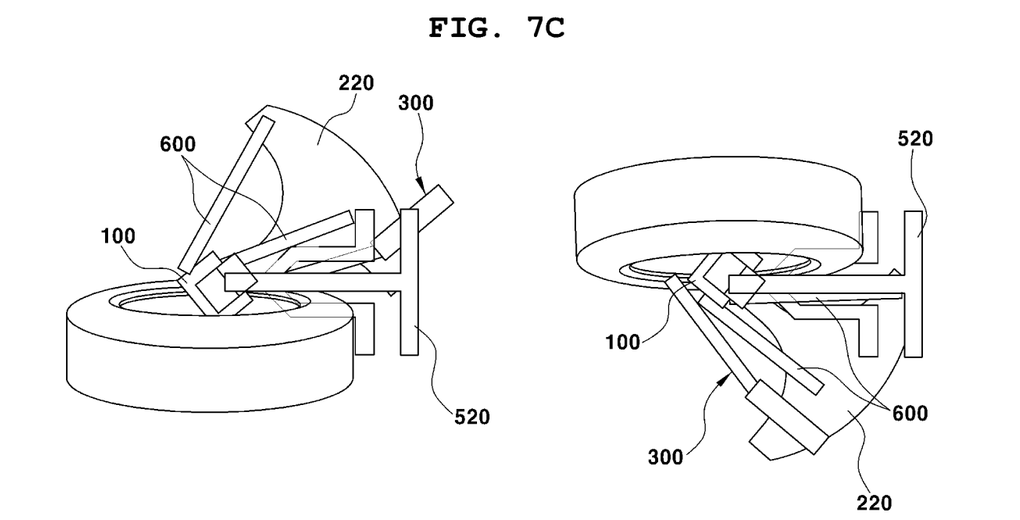
FIG. 7C shows an input of a steering angle through both the rack steering unit and the steering unit of the independent corner module according to an embodiment of the present disclosure.

In addition, FIG. 7C shows the driving of the independent corner module in which the steering unit 200 and the rack steering unit 300 are simultaneously providing the steering angle to the wheel 10.

As illustrated in FIG. 7B, the steering frame 220 is rotated by the motor 210, and is rotated around the joint unit 400 simultaneously with the double wishbone knuckle 120. At the same time, the steering angle is input through the rack steering unit 300 along the contact point of the ball joint portion 130 and the lower links 600.

In addition, since the motor 210 of the steering unit 200 and the rack motor 310 of the rack steering unit 300 are capable of being sequentially or simultaneously driven, up to 90 degrees to −90 degrees may be input to the wheel 10.

As illustrated in FIGS. 7A to 7C, the input of the steering angle to the wheel 10 may be performed by independently or simultaneously driving the rack steering unit 300 and the steering unit 200. In addition, when the steering is performed under a driving condition of the vehicle, the steering through the rack steering unit 300 capable of inputting the steering angle through the first kingpin axis A may be performed early. Further, in response to a steering request exceeding the range of the steering angle of the rack steering unit 300, an additional input of the steering angle of the steering unit 200 may be performed.

The foregoing detailed description is for illustrative purposes only. Further, the description provides embodiments of the present disclosure and the present disclosure may be used in other various combinations, changes, and environments. That is, the present disclosure may be changed or modified within the scope of the present disclosure described herein, a range equivalent to the description, and/or within the knowledge or technology in the related art. The embodiment shows an optimum state for achieving the spirit of the present disclosure and may be changed in various ways for the detailed application fields and use of the present disclosure. Therefore, the detailed description of the present disclosure is not intended to limit the present disclosure in the embodiments. Further, the claims should be construed as including other embodiments.

What is claimed is:

1. An independent corner module comprising:
    a knuckle unit positioned at an inward area of a wheel;
    an upper arm fastened between an upper end of the knuckle unit and a vehicle body;
    a lower arm fastened between a lower end of the knuckle unit and the vehicle body;
    a steering unit configured to input a steering angle to the knuckle unit by being rotated with respect to the lower arm; and
    a rack steering unit positioned under the steering unit and fastened to the knuckle unit, the rack steering unit being configured to apply a rotating force to the knuckle unit by varying a length thereof,
    wherein the steering unit comprises:
        a motor positioned at a first end of the lower arm and configured to apply a driving force;
        a steering frame configured to be rotated with respect to a first end thereof fastened to the knuckle unit according to the driving force of the motor so that the lower arm is independently positioned in response to the rotation of the steering frame; and
        a motor gear portion positioned at a rotary shaft of the motor.

2. The independent corner module of claim 1, wherein the steering frame comprises a steering gear portion fastened to the motor gear portion with respect to the first end of the steering frame fastened to the knuckle unit, the steering gear portion being formed in an arc shape.

3. The independent corner module of claim 1, further comprising a joint unit penetrating the lower arm and positioned at the knuckle unit such that the steering frame and the knuckle unit are integrally fastened to each other.

4. The independent corner module of claim 1, wherein the knuckle unit further comprises:
    a knuckle fastened to a first end of the wheel;
    a double wishbone knuckle positioned on an inward area of the knuckle and having a lower end thereof fastened to the lower arm; and
    a ball joint portion positioned between the knuckle and the double wishbone knuckle.

5. The independent corner module of claim 4, wherein the rack steering unit comprises:
    a rack motor positioned at the steering unit; and
    a rack rod having a first end thereof fastened to a first side end of the knuckle, the rack rod being configured such that a length thereof is varied by a driving force of the rack motor.

6. The independent corner module of claim 5, wherein the first end of the rack rod is eccentrically fastened to the first side end of the knuckle, and the knuckle is configured to be rotated with respect to the double wishbone knuckle in response to a change in the length of the rack rod.

7. The independent corner module of claim 4, further comprising two lower links positioned between a lower end of the knuckle and the steering unit.

8. The independent corner module of claim 7, wherein a first end of each of the two lower links is positioned at a lower surface of the knuckle, and the first ends of the two lower links are spaced apart from each other by a predetermined distance.

9. An independent corner module, comprising:
    a knuckle unit positioned at an inward area of a wheel, wherein the knuckle unit comprises a knuckle fastened to a first end of the wheel, a double wishbone knuckle positioned on an inward area of the knuckle, and a ball joint portion positioned between the knuckle and the double wishbone knuckle;
    an upper arm fastened between an upper end of the knuckle unit and a vehicle body;
    a lower arm fastened between a lower end of the knuckle unit and the vehicle body, wherein a lower end of the double wishbone knuckle is fastened to the lower arm;
    a steering unit configured to input a steering angle to the knuckle unit by being rotated with respect to the lower arm;
    a rack steering unit positioned under the steering unit and fastened to the knuckle unit, the rack steering unit being configured to apply a rotating force to the knuckle unit by varying a length thereof;
    two lower links positioned between a lower end of the knuckle and the steering unit;
    a first kingpin axis formed on the ball joint portion and on a contact point of extension lines of the two lower links; and
    a second kingpin axis formed between one end where the upper arm and the double wishbone knuckle are fastened to each other and a second end where the lower arm and the double wishbone knuckle are fastened to each other.

10. A vehicle comprising:
    a vehicle body;
    a crank positioned at the vehicle body;
    a wheel coupled to the vehicle body;
    a knuckle unit positioned at an inward area of the wheel;
    an upper arm fastened between an upper end of the knuckle unit and the vehicle body;
    a lower arm fastened between a lower end of the knuckle unit and the vehicle body;
    a push rod provided between the crank positioned at the vehicle body and a first end of the lower arm;
    a steering unit configured to input a steering angle to the knuckle unit by being rotated with respect to the lower arm; and
    a rack steering unit positioned under the steering unit and fastened to the knuckle unit, the rack steering unit being configured to apply a rotating force to the knuckle unit by varying a length thereof.

11. The vehicle of claim 10, further comprising a shock absorber positioned between the crank and the vehicle body.

12. The vehicle of claim 11, wherein the steering unit comprises:
    a motor positioned at a first end of the lower arm and configured to apply a driving force;
    a steering frame configured to be rotated with respect to a first end thereof fastened to the knuckle unit according to the driving force of the motor; and
    a motor gear portion positioned at a rotary shaft of the motor.

13. The vehicle of claim 12, wherein the steering frame comprises a steering gear portion fastened to the motor gear portion with respect to the first end of the steering frame fastened to the knuckle unit, the steering gear portion being formed in an arc shape.

14. The vehicle of claim 12, further comprising a joint unit penetrating the lower arm and positioned at the knuckle unit such that the steering frame and the knuckle unit are integrally fastened to each other.

15. The vehicle of claim 10, wherein the knuckle unit further comprises:
- a knuckle fastened to a first end of the wheel;
- a double wishbone knuckle positioned on an inward area of the knuckle and having a lower end thereof fastened to the lower arm; and
- a ball joint portion positioned between the knuckle and the double wishbone knuckle.

16. The vehicle of claim 15, wherein the rack steering unit comprises:
- a rack motor positioned at the steering unit; and
- a rack rod having a first end thereof fastened to a first side end of the knuckle, the rack rod being configured such that a length thereof is varied by a driving force of the rack motor.

17. The vehicle of claim 16, wherein the first end of the rack rod is eccentrically fastened to the first side end of the knuckle, and the knuckle is configured to be rotated with respect to the double wishbone knuckle in response to a change in the length of the rack rod.

18. The vehicle of claim 15, further comprising two lower links positioned between a lower end of the knuckle and the steering unit.

19. The vehicle of claim 18, wherein a first end of each of the two lower links is positioned at a lower surface of the knuckle, and the first ends of the two lower links are spaced apart from each other by a predetermined distance.

20. The independent corner module of claim 1, further comprising a push rod provided between a crank positioned at the vehicle body and a first end of the lower arm.

\* \* \* \* \*

UNITED STATES PATENT AND TRADEMARK OFFICE
CERTIFICATE OF CORRECTION

PATENT NO. : 11,820,449 B2
APPLICATION NO. : 17/956978
DATED : November 21, 2023
INVENTOR(S) : Chang et al.

It is certified that error appears in the above-identified patent and that said Letters Patent is hereby corrected as shown below:

In the Claims

In Column 10, in Claim 12, Line 50, delete "claim 11," and insert -- claim 10, --.

Signed and Sealed this
Thirteenth Day of February, 2024

Katherine Kelly Vidal
*Director of the United States Patent and Trademark Office*